(12) United States Patent
Tsukamoto et al.

(10) Patent No.: US 7,030,526 B2
(45) Date of Patent: Apr. 18, 2006

(54) INTEGRATED DRIVE MOTOR/DIFFERENTIAL/INVERTER UNIT WITH IMPROVED HOUSING FOR A VEHICLE

(75) Inventors: Masahiro Tsukamoto, Yokohama (JP);
Yuki Nakajima, Yokohama (JP);
Toshiro Shinohara, Yokosuka (JP);
Hiroyuki Kaneko, Yokohama (JP);
Yasuhiko Kitajima, Kamakura (JP);
Makoto Iwashima, Yokosuka (JP);
Akihiro Hanamura, Yokohama (JP);
Kouichirou Yonekura, Kanagawa-ken (JP); Tadayuki Hatsuda, Fujisawa (JP);
Masakazu Kobayashi, Yokosuka (JP);
Yutaro Kaneko, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 33 days.

(21) Appl. No.: 10/700,645

(22) Filed: Nov. 5, 2003

(65) Prior Publication Data

US 2004/0108778 A1    Jun. 10, 2004

(30) Foreign Application Priority Data

Dec. 5, 2002    (JP) ............................. 2002-353478

(51) Int. Cl.
*H02K 7/116*    (2006.01)
*H02K 11/04*    (2006.01)
*H60K 1/00*    (2006.01)

(52) U.S. Cl. ............................. 310/90; 310/83; 310/89; 310/71; 180/65.1; 180/65.5

(58) Field of Classification Search .................. 310/83, 310/89, 71, 43, 88, 90; 180/65.1, 65.5
See application file for complete search history.

(56) References Cited

U.S. PATENT DOCUMENTS

| 4,528,473 | A | * | 7/1985 | Tezuka ........................ 310/256 |
| 5,293,107 | A | | 3/1994 | Akeel ..................... 318/568.11 |
| 5,491,370 | A | * | 2/1996 | Schneider et al. ............. 310/54 |
| 5,517,401 | A | | 5/1996 | Kinoshita et al. .............. 363/98 |
| 5,632,351 | A | * | 5/1997 | Ishiyama .................... 180/65.1 |
| 6,169,345 | B1 | | 1/2001 | Bloch et al. ............... 310/67 R |
| 6,524,082 | B1 | * | 2/2003 | Morita et al. ................ 417/366 |
| 2002/0175008 | A1 | * | 11/2002 | Angerer et al. ............. 180/65.1 |
| 2004/0108778 | A1 | * | 6/2004 | Tsukamoto et al. ........... 310/83 |
| 2004/0163409 | A1 | * | 8/2004 | Nakajima et al. ............. 62/505 |

FOREIGN PATENT DOCUMENTS

| EP | 1426221 | * | 6/2004 |
| JP | 07-231672 | * | 8/1995 |
| JP | 7-298552 A | | 11/1995 |

* cited by examiner

OTHER PUBLICATIONS

Translation of Yasuda, "Electric Motor for Driving Vehicle", JP 07-298552, Nov. 1995.*

*Primary Examiner*—Karl Tamai
(74) *Attorney, Agent, or Firm*—Foley & Lardner LLP

(57) ABSTRACT

An integrated drive motor unit which is integrally constituted of a motor, an inverter and a reducer differential unit arranged in a row, and a frame member. The reducer differential unit is connected to an output shaft of the motor, and distributes torque of the motor to a pair of axles, one of which passes through the inverter. The frame member constitutes a part of the motor and a part of the reducer differential unit, and has a portion surrounding the axle passing through the inverter. The inverter is disposed outside the frame member.

8 Claims, 1 Drawing Sheet

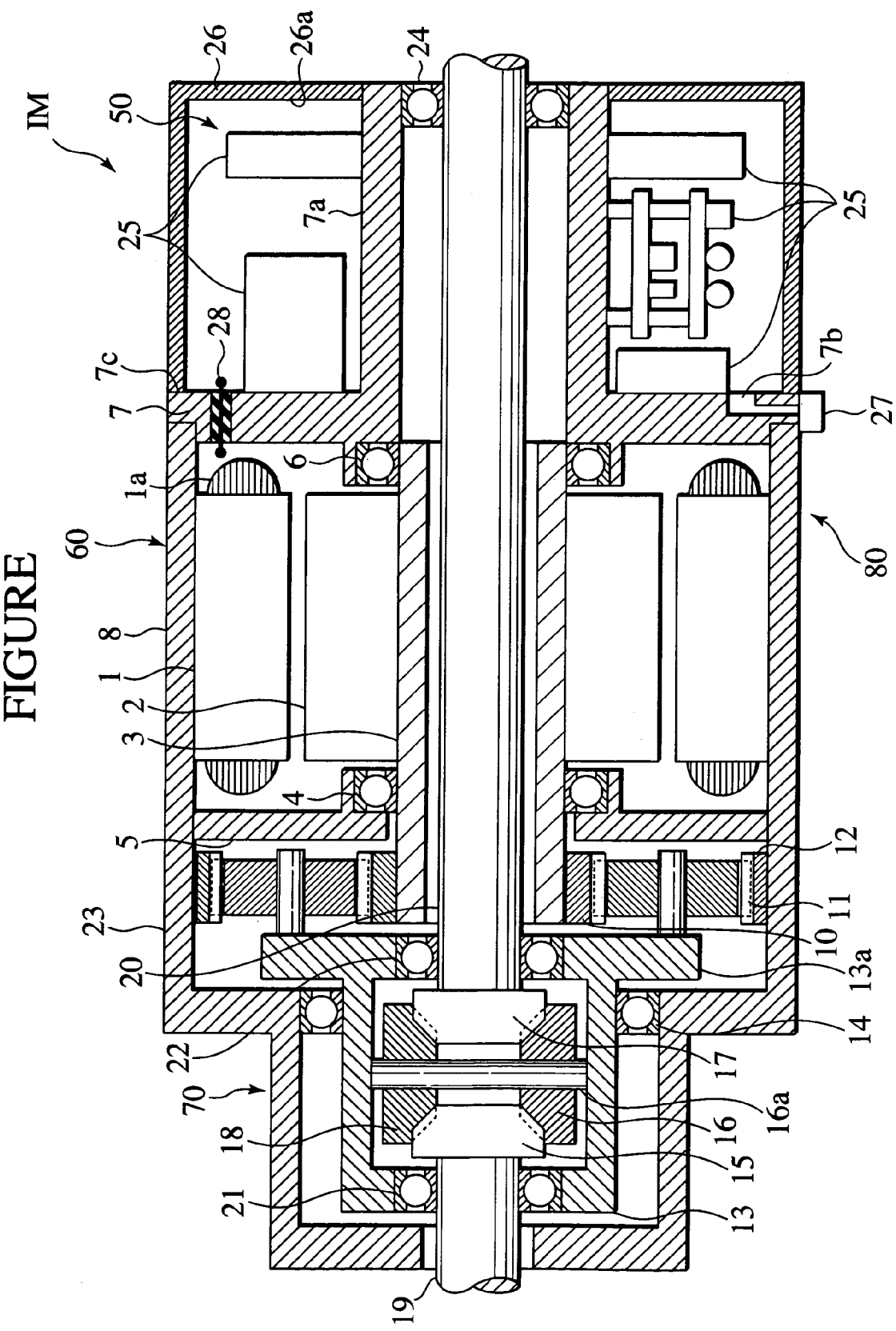
FIGURE

INTEGRATED DRIVE MOTOR/DIFFERENTIAL/INVERTER UNIT WITH IMPROVED HOUSING FOR A VEHICLE

BACKGROUND OF THE INVENTION

1. Field of the Invention

The present invention relates to a drive motor unit including a motor, an inverter, reduction gears, and a differential, all of which are integrated into the drive motor unit being arranged in a row.

2. Description of Related Art

Japanese Patent Application Laid-Open No. 07-298552 discloses a drive motor unit having a motor, an inverter, and an inverter cooling chamber, all of which are integrated thereinto, in which the inverter cooling chamber is interposed between the motor and the inverter.

SUMMARY OF THE INVENTION

In the above-described drive motor unit, all main components of the drive motor unit, which are the motor, inverter, and inverter cooling chamber, are surrounded by a heavy structural member. Therefore, the drive motor unit becomes heavy.

The present invention was made in the light of this problem. An object of the present invention is to provide a light-weight integrated drive motor unit.

An aspect of the present invention is an integrated drive motor unit comprising: a motor having an output shaft; an inverter for feeding power to the motor; a reducer differential unit connected to the output shaft, which distributes torque of the motor to a pair of axles, one of the axles passing through the inverter; and a frame member for allowing the motor, the inverter and the reducer differential unit to be integrated, the frame member constituting a part of the motor and a part of the reducer differential unit, and having a portion surrounding the axle passing through the inverter, wherein the inverter is disposed outside the frame member.

BRIEF DESCRIPTION OF THE DRAWINGS

The invention will now be described with reference to the accompanying drawing wherein:

FIGURE is a sectional view of an integrated drive motor unit of an embodiment of the present invention.

DETAILED DESCRIPTION OF THE PREFERRED EMBODIMENT

An embodiment of the present invention will be explained below with reference to the drawing.

In an integrated drive motor unit IM of FIGURE, an inverter section 50, a motor section 60, and a reduction gears and differential section 70 as a reducer differential unit are arranged in a row and in this order from the right in the drawing. A stator 1 of the motor section 60 is fixed in a motor housing 8. The stator 1 includes stator winding 1a, and when the stator winding 1a is fed electrical power, the stator 1 applies torque to a rotor 2. The rotor 2 is fixed to a hollow motor output shaft 3, which transmits the torque to a sun gear 10. Bearings 4 and 6 are provided as bearings supporting the left and right ends of the motor output shaft 3. The bearing 4 is fixed to a left flange 5 of the motor section 60, and the bearing 6 as a first bearing is fixed to a right flange 7 of the motor section 60. The positions of the bearings 4 and 6 are important to keep a uniform clearance between the stator 1 and the rotor 2, which is called an air gap, usually of about 1 mm or smaller. In this embodiment, the bearings 4 and 6 are set in radial positions on the left and right flanges 5 and 7 respectively, taking the inner circumference of the motor housing 8, to which the stator 1 is fixed, as a reference, whereby accurate radial positions of the bearings 4 and 6 are obtained. As described above, the motor section 60 comprises the stator 1, the rotor 2, the motor output shaft 3, the bearings 4 and 6, the flanges 5 and 7, and the motor housing 8.

In this embodiment, as shown in FIGURE, a planetary gear system is adopted for reduction gears. The planetary gear reducer includes a sun gear 10, planet gears 11, a ring gear 12, and a gear housing 23. The sun gear 10 is fixed to the left end portion of the motor output shaft 3. The ring gear 12 is fixed to the inner circumferential of the gear housing 23. The sun gear 10 and the ring gear 12 are connected by the planet gears 11 meshing therewith therebetween. Motor rotation inputted to the sun gear 10 is transmitted at a reduced rotational speed to a planet gear carrier 13a carrying the planet gears 11 with the shafts of the planet gears 11 fixed thereto. The planet gear carrier 13a constitutes a part of a gear carrier 13 for gears of the differential. The gear carrier 13 is rotatably supported by a bearing 14 in the gear housing 23. The motor rotation transmitted to the planet gear carrier 13a is further transmitted through the gear carrier 13 to four bevel gears constituting the differential. The gears of the differential are constituted of side gears 15 and 17, and pinion gears 16 and 18 which are rotatably supported by a pinion shaft 16a fitted to the gear carrier 13 and mesh with the side gears 15 and 17. These gears can be rotated integrally with the gear carrier 13. The side gear 15 on the left side of FIGURE is fixed to a left drive shaft (left axle) 19 extending leftward and being linked to a left wheel (not shown), while the side gear 17 on the right side is fixed to a right drive shaft (right axle) 20 extending rightward and being linked to a right wheel (not shown). When the left and right drive shafts 19 and 20 rotate at the same rotational speed, four bevel gears 15, 16, 17, and 18 integrally rotate together with the gear carrier 13, without making relative rotation. When the left and right drive shafts 19 and 20 rotate at different rotational speed, four bevel gears 15, 16, 17, and 18 rotate relative to each other to thereby uniformly distribute the same torque to the left and right drive shafts 19 and 20, absorbing the difference in rotational speed. The reduction gears and differential section 70 is constituted of the reduction gears and the gears of the differential as described above. In this embodiment, one-stage planetary gears serve as the reduction gears. However, multi-stage planetary gears or a spur gear reducer will not depart from the gist of the invention. In addition, the gear system of the differential can be replaced with another system such as a planetary gear system.

The right drive shaft 20 passes through the inside of the hollow motor output shaft 3, a hole provided at the center of the right flange 7 and the inside of a tubular portion 7a which is formed integrally with the right flange 7 and extends axially rightward from the periphery of the center hole on the right flange 7, and reaches to the right end of the integrated drive motor unit IM, where the right end portion of the right drive shaft 20 is rotatably supported by a bearing 24 (second bearing) provided at the right end of the tubular portion 7a. Meanwhile, the right end portion of the motor output shaft 3 is rotatably supported by the bearing 6 which is positioned at the center of the right flange 7 taking the inner circumference of the motor housing 8 as a reference. Therefore, the right drive shaft 20 is, being supported by the bearing 24, maintained accurately in a required coaxiality with the motor output shaft 3.

An inverter 50, which feeds alternating current (AC) electric power to the stator winding 1*a* of the motor section 60, is provided on the outside of the tubular portion 7*a*, that is the side opposite to the inner space of the tubular portion 7*a* where the right drive shaft 20 passes through.

Around the inverter 50, a protective cover 26 is provided to cover the inverter 50 with. The protective cover 26 has a function to protect the components 25 of the inverter 50 from splashes of water, mud, stones and the like from a road, and also has a function to shield an electromagnetic noise generated by the inverter 50. As shown in FIGURE, the components 25 of the inverter 50 are mounted not on the protective cover 26, but on the right side face of the right flange 7 and/or the outer side of the tubular portion 7*a*. The material of the protective cover 26 does not need to have so much strength, but preferably has conductivity for the electromagnetic shield effect. In this embodiment, the protective cover 26 is made of resin and formed to have on its inner surface a film 26*a* having the electromagnetic shield effect such as a metal foil formed by vapor deposition and the like, to thereby achieve a light-weight structure for an integrated drive motor unit IM, while maintaining the electromagnetic shield effect of metal materials. Moreover, any metal material which realizes the protective cover 26 lighter than the tubular portion 7*a*, such as metal sheet thinner than outer side wall of the tubular portion 7*a*, is satisfactory for application to the protective cover 26. By the metal sheet, both the electromagnetic shield effect and light-weight structure are provided for an integrated drive motor unit IM.

As shown in FIGURE, on the right side face of the right flange 7, a hole 7*b* is provided, being connected to the outer periphery of the flange 7, where a connector 27 is provided for supplying direct current (DC) electric power from a power source such as a battery to the inverter 50. The DC electric power is supplied to the components 25 of the inverter 50 via an electric line (not shown) passing through the hole 7*b*, and is converted by the inverter into AC electric power to be fed to the motor section 60. The AC electric power as an output of the inverter 50 is fed to the stator winding 1*a* via an insulation terminal 28 which has a conductor core covered with an insulator such as ceramics, and penetrates through the flange 7. Due to the insulation terminal 28, the noise generated by the inverter 50 is effectively shielded and the wiring (not shown) from the inverter 50 to the stator coil wiring 1*a* is shortened, whereby energy loss thereat is reduced. By employing the above structure, the mating face 7*c* of the right flange 7 to where the protective cover 26 is to be attached can be flat, and the protective cover 26 can be formed in a simple shape, whereby manufacturing thereof is facilitated and liquid-tight seal at the connection of the protective cover 26 and the right flange 7 is secured.

Note that a structural frame member 80 of the embodiment of FIGURE includes the right flange 7, the motor housing 8, the left flange 5, and the gear housing 23, wherein the right flange 7, together with the tubular portion 7*a*, constitute the right frame member of the motor section 60, the motor housing 8 constitutes the outer circumferential frame member of the motor section 60, the left flange 5 constitutes the left frame member of the motor section 60, and the gear housing 23 constitutes the outer frame member of the reduction gears and differential section 70. The structural member 80 thus constitutes the frame of the whole integrated drive motor unit IM, having the motor section 60, the reduction gears and differential section 70, and the inverter 50 integrated.

In this embodiment, only inverter 50 is disposed outside the structural member 80 (the right flange 7 and the tubular portion 7*a*). Among components of the integrated drive motor unit IM, the motor housing 8 which supports the stator 1 of the motor section 60, the gear housing 23 of the reduction gears and differential section 70 which supports the bearing 24, and supporting members for the bearings 4, 6, and 14, including the flanges 5 and 7, and the tubular portion 7*a*, are required to have strength to bear mechanical load. The protective cover 26 of the inverter 50 does not receive such a mechanical load, and is therefore not required to have such a strength.

However, in the related art, all the components of an integrated drive motor unit were formerly enclosed in a structural frame member of the motor. And, in order to support a bearing located on radially inner side of the inverter, it has been necessary to provide the structural frame member on radially outer side of the inverter, whereby the structural frame member was formed in a shape surrounding the inverter.

This structural frame member has been formed of a relatively thick metal member to obtain the required mechanical strength, resulting in increased weight of the drive motor unit.

According to this embodiment, the inverter 50, which is light in weight and receives no mechanical load, is disposed outside the structural member 80. This eliminates the necessity to cover the inverter 50 with a heavy structural member, thereby allowing the structural member 80 to be lightened.

In this embodiment, the tubular portion 7*a* is integrally formed as a part of the structural member 80, and on the right end of the tubular portion 7*a*, the bearing 24 is provided as a second bearing for supporting the right end of the right drive shaft 20. And the tubular portion 7*a* extends axially rightward from the central portion of the right flange 7, which is a structural member closest to the bearing 24 and where the bearing 6 fixed to as a first bearing supporting the end of the motor output shaft 3.

According to the above structure, a structural member formerly constituted of two portions such as a large diameter tubular portion surrounding the inverter and a portion for closing an end opening of the tubular portion is replaced with only the small diameter tubular portion 7*a*. Therefore, the weight of the entire structural member 80, that is, the weight of the integrated drive motor unit IM is reduced.

Moreover, by taking a part of the structural member 80, which is the inner circumference of the motor housing 8, as a reference to determine radial positions of the bearings 4 and 6 of the motor output shaft 3 and the bearing 24 of the right drive shaft 20, enhanced coaxiality is achieved, and assembly of the motor unit is therefore facilitated.

It is not necessary to mount the components 25 of the inverter 50 mainly composed of electrical parts on the protective cover 26. The components 25 are firmly held by mounting them onto the outer surface of a part of the structural member 80, which is the outer side of the tubular portion 7*a* and the right side face of the right flange 7. Also, the components 25 can be mounted/demounted with the protective cover 26 taken off, whereby workability for assembling the inverter 50 is improved.

In this embodiment, as shown in FIGURE, the inverter 50, the motor section 60, and the reduction gears and differential section 70 are arranged in this order from the right, and the components mechanically and/or electrically connected to each other can be arranged side by side without wasting space. The electric power is fed to the motor section 60 from the inverter 50 which is arranged to be adjacent on the right side thereof. Meanwhile, driving force is transmitted to the reduction gears and differential section 70 from the motor section 60 which is arranged to be adjacent on the right side of the reduction gears and differential section 70. Arrangement in another order of the motor section 60, the inverter 50, and the reduction gears and differential section 70, or the order of the inverter 50, the reduction gears and differential section 70, and the motor section 60 can exhibit the above-described effect.

Moreover, the above-described structure can be applied to variety of motor types which has a control unit for the motor, such as an inverter, integrated therewith. For example, the motor type can be a brushless synchronous motor or a DC brush motor using a permanent magnet, or an induction motor or a reluctance motor not using a permanent magnet.

The present disclosure relates to subject matter contained in Japanese Patent Application No. 2002-353478, filed on Dec. 5, 2002, the disclosure of which is expressly incorporated herein by reference in its entirety.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

What is claimed is:

1. An integrated drive motor unit comprising:
   a motor having an output shaft;
   an inverter for feeding power to the motor;
   a reducer differential unit connected to the output shaft, which distributes torque of the motor to a pair of axles, one of the axles passing through the inverter; and
   a frame member for allowing the motor, the inverter and the reducer differential unit to be integrated, the frame member constituting a part of the motor and a part of the reducer differential unit, and including a flange of the motor formed to have on a central portion thereof a small diameter tubular portion extending axially therefrom and rotatably supporting the axle passing through the inverter, wherein
   the inverter is disposed outside the small diameter tubular portion.

2. The integrated drive motor unit according to claim 1, wherein
   the motor, the inverter and the reducer differential unit are arranged in a row in an order of the inverter, the motor, the reducer differential unit.

3. The integrated drive motor unit according to claim 1, wherein
   components of the inverter are mounted on the frame member.

4. The integrated drive motor unit according to claim 1, wherein
   the inverter is provided with a metal protective cover which is formed to be thinner than the frame member.

5. The integrated drive motor unit according to claim 1, wherein
   the inverter is provided with a resin protective cover which is formed to have a layer for electromagnetic shielding.

6. The integrated drive motor unit according to claim 1, wherein
   the frame member is provided on the flange of the motor and the small diameter tubular portion thereof with a first bearing for supporting the output shaft of the motor and a second bearing for supporting the axle passing through the inverter.

7. The integrated drive motor unit according to claim 1, wherein
   the frame member comprises the flange of the motor on the side of the inverter, and wherein a connector for supplying power to the inverter is provided on the flange.

8. The integrated drive motor unit according to claim 1, wherein
   the frame member comprises the flange of the motor on the side of the inverter, and wherein an insulated terminal is provided through the flange.

* * * * *